United States Patent [19]
Schuster

[11] Patent Number: 4,601,660
[45] Date of Patent: Jul. 22, 1986

[54] LOADING APPARATUS FOR HEAT TREATMENT FURNACE

[75] Inventor: Rolf Schuster, Hanau, Fed. Rep. of Germany

[73] Assignee: Degussa Aktiengesellschaft, Frankfurt am Main, Fed. Rep. of Germany

[21] Appl. No.: 746,052

[22] Filed: Jun. 18, 1985

[30] Foreign Application Priority Data

Aug. 16, 1984 [DE] Fed. Rep. of Germany ....... 3430118

[51] Int. Cl.⁴ .......................... F27D 3/00; F27B 9/27; B65G 25/00

[52] U.S. Cl. .................................... 432/239; 414/180; 432/137

[58] Field of Search ............... 432/121, 123, 137, 239; 414/156, 157, 180, 181, 182

[56] References Cited

U.S. PATENT DOCUMENTS 1,801,349 4/1931 Holt .................................... 414/157
3,968,889 7/1976 Hepp .................................... 432/121

*Primary Examiner*—John J. Camby
*Attorney, Agent, or Firm*—Cushman, Darby & Cushman

[57] ABSTRACT

There is described a loading apparatus for conveying charging grates in heat treatment furnaces has one or more chain strands which run in guide rails which also extend into the heat treatment furnace; at the end of the chain strands facing toward the furnace, the chain links have pivoting rocker arms on which there are secured support segments; the raising and lowering of the support segments is carried out by means of support blocks and retaining cams.

7 Claims, 3 Drawing Figures

LOADING APPARATUS FOR HEAT TREATMENT FURNACE

BACKGROUND OF THE INVENTION

The invention is directed to a loading apparatus for conveying supporting members or charging grates into heat treatment furnaces and includes one or more chain strands driven by chain sprockets and carrying the charge grate and running in guide rails, which chain strands are composed of individual chain links provided with rollers.

Heat treatment furnaces are provided with a high temperature zone and a loading table. In addition, there can also be cooling and quenching zones which always are separated from each other by doors.

There are known loading apparatuses for charging such heat treatment furnaces in which the charging grates are driven through the treatment zones of the furnace with chain strands extending or running in guide rails and driven by chain sprockets. The conveyance is carried out with the help of a cams and pawl mechanism on the chain strands which engage each charging grate.

A kind of loading apparatus for heat treatment furnaces is known from German AS 1279706 in which the chain strands are composed of individual chain links provided with sprocket drives and the conveyance of the charging grates is carried out with the help of cams. However, this apparatus has the disadvantage that the charging grates cannot be driven directly into the furnace but are set down outside the furnace and then must be dragged over steel rails and/or fire bricks which can considerably reduce the life of the grate member.

Therefore, it is the object of the present invention to provide a loading apparatus for the conveyance of charging grates in heat treatment furnaces with one or more chain strands carrying the charging grates and being driven by chain sprockets and with guide rails provided for the chains strands, which chain strands are composed of chain links provided with rollers which deposit the charging grates directly at their destination and which grates can be removed again from the furnace.

SUMMARY OF THE INVENTION

This object is attained according to the invention by extending the guide rails into the heat treatment furnace, that at the end of the chain strands facing the heat treatment furnace at a length which corresponds approximately to about the length of the charging grates there are secured on the axles of the chain links in each case pawls mounted for pivotal movement about a horizontal axis, that is, upwardly directed rocker arms pawls, at the ends of which there are mounted support segments.

On the end of the chain link, facing the furnace, carrying the support segments on the chain strand, there are directly secured behind the rear rocker arm in each case a support block and on the rear support segment in each case a retaining cam.

Preferably, one support segment is carried in each case by two or three chain links. Also, it can be advantageous if the first and last support segments are provided at the outer ends with a roll member.

The chain strands can be stationarily mounted on the heat treatment furnace. However, advantageously, they are mounted on a charging carriage which additionally carries one or more upsetting devices, which can engage upsetting device nozzles on individual rocker arms and are provided with clips which elastically laterally of the support segments upwardly surpass the level of the support segments.

This loading apparatus has the advantage that the charging grates are raised from the support and are deposited directly at the destination without being dragged via steel rails or fire bricks and at the same time being exposed to high tensile strain and bending stress which greatly damages the life span of these charging grates, especially at high treatment temperatures.

BRIEF DESCRIPTION OF THE DRAWINGS

FIG. 1 is a plan view;

FIG. 2 is a longitudinal section along a chain strand; and

DETAILED DESCRIPTION

Figure 1:
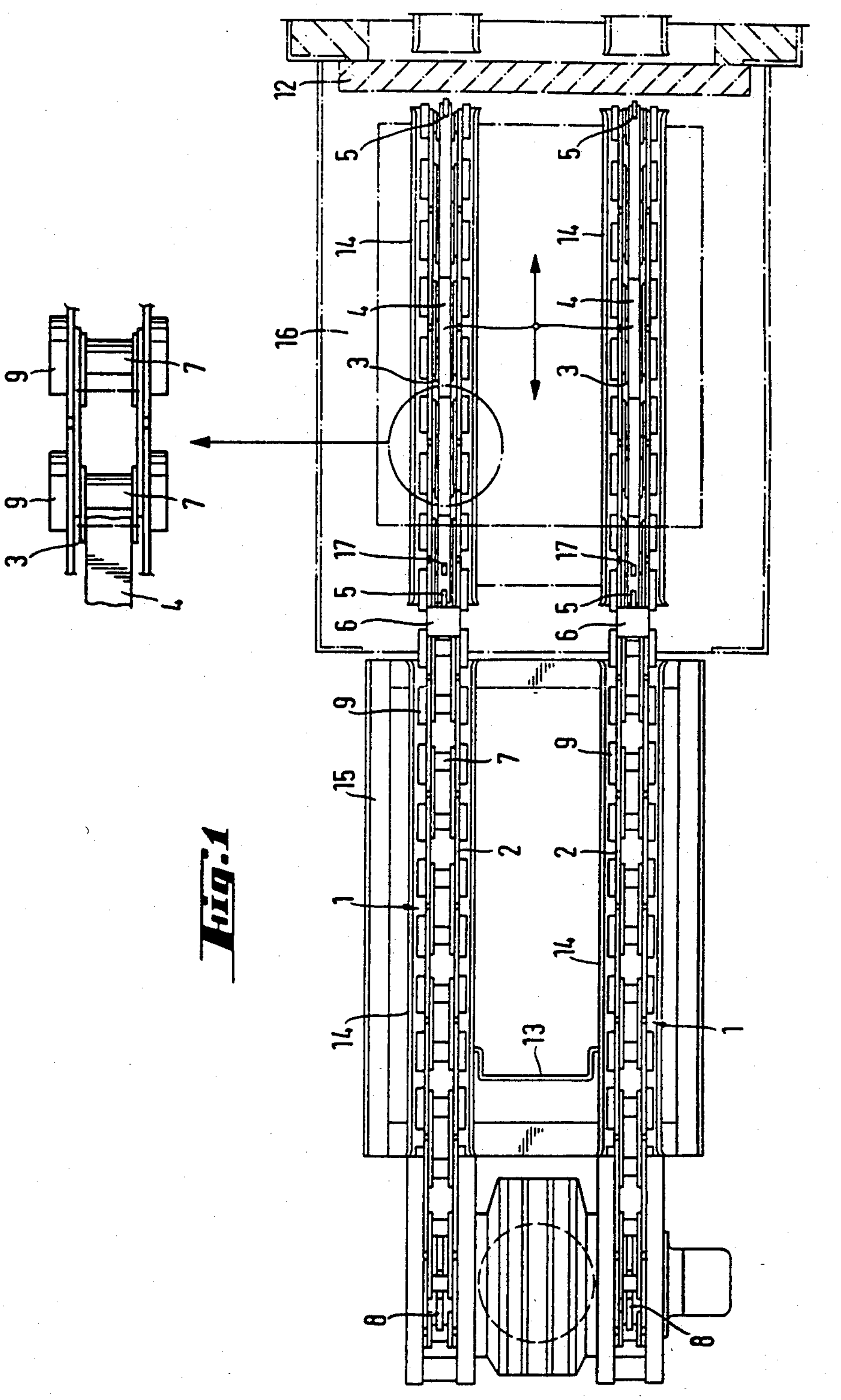
FIGS. 1, 2 schematically illustrate one form of the loading apparatus of the invention.
Figure 2:
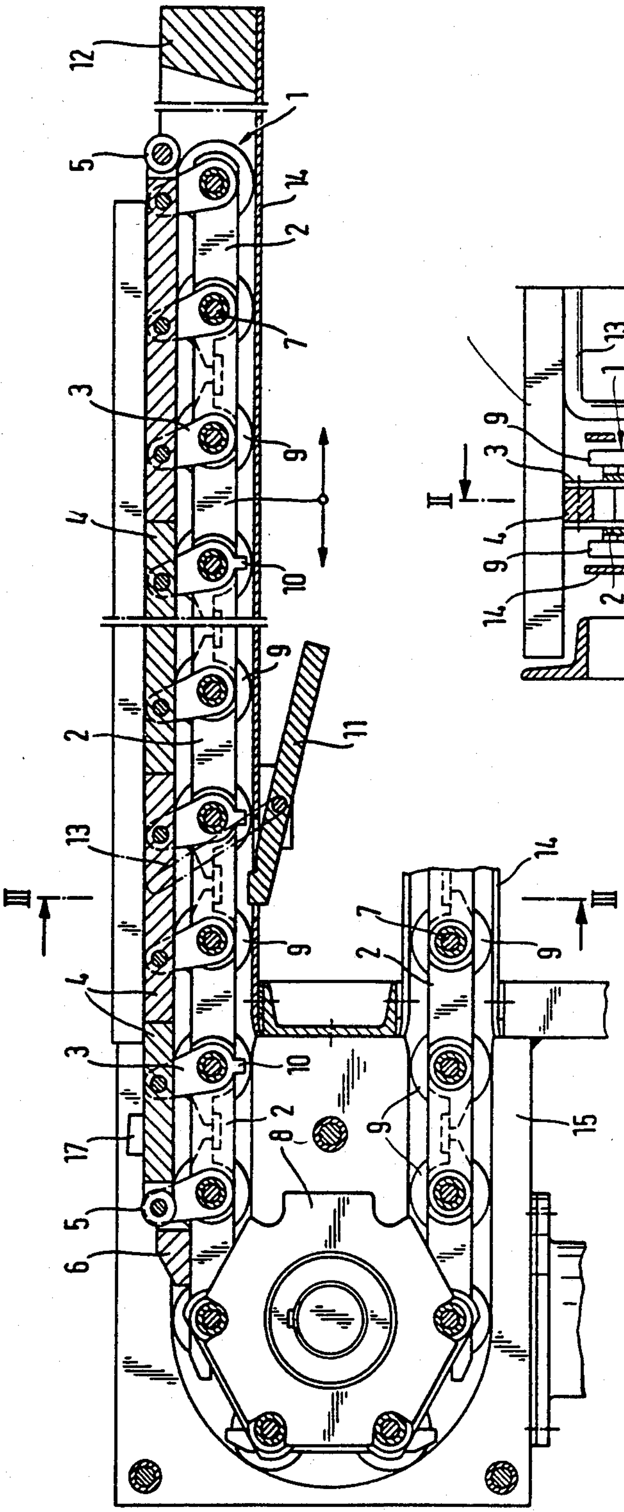
Figure 3:
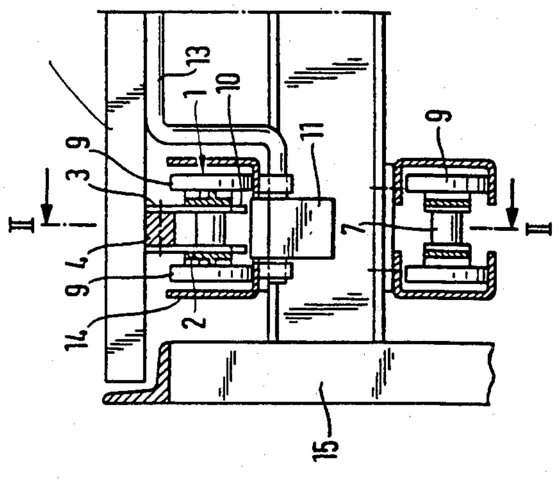
FIG. 3 is sectional view through a chain strand along the line 3—3 of FIG. 2.

The loading apparatus consists of two chain strands 1 which are conveyed in guide rails 14 and are driven by means of chain sprockets 8. These guide rails 14 are located both on the charging carriage 15 and also in the operating area of the heat treatment furnace 16 and are bounded by a solid stop 12. The chain strands 1 are composed of the individual chain links 2, which are provided on both sides with rollers 9. There are secured pivotable rocker arms 3 on the axles 7 of the chain links 2 which rocker arms carry support segments 4. The end support segments 4 are provided in each case with a roller 5 over which can be rolled on stationary surfaces by raising and lowering the support segments 4. The support segments 4 are dimensioned so that they form a continuous support in both the raised and lowered conditions.

There is securely joined with the chain strand 1 a support block 6 which sits on the end of the chain strand 1 facing the heat treatment furnace and located directly behind the last rocker arm 3. There is also fastened on the last support segment 4 a retaining cam 17.

One or more rocker arms 3 are provided with upsetting cams 10, in which in each case an upsetting device 11 can engage, which can lower the balk segment 4 raised through the support block 6, while the rocke arm 3 is upset to the other side. These upsetting devices 11 are provided with crank arm 13 which laterally of the support segment 4 surpasses it upwardly. This has as a result that in the loading of the support segments 4 with a charging grate the clip 13 is lowered and the upsetter 11 cannot function.

In connection with the drawings, there is explained below the operating procedure of the loading device.

In driving a charging grate into the heat treatment furnace 16, the grate is on the charging carriage 15. The chain strand 1 is conveyed via the chain sprocket 8 under the charging grate, whereby the support segments 4 rest on the chain links 2. Insofar as the support block 6 has passed the chain sprocket 8 and this chain strand portion through this is converted from a vertical position into a horizontal one, the support block 6 presses against the rocker arms 3 and consequently causes a raising of the support segment 4 and with it also the charging grate. This is carried into the heat treatment furnace 16 and deposited there. This occurs by means of retaining cams 17 which engage in a corresponding device on the door of the furnace and tip the support segment 4 in the return of the chain strand 1, so that it again rests upon the chain links 2.

In the travelling of the charging grate out of the heat treatment furnace 16, the support segments 4 uprighted by the support block 6 are tilted in the passage of the upsetting device 11 through engagement in a corresponding upsetting cam 11, therewith rest on the chain links 2 and are brought under the charging grate. In starting the forward support segments with the rolls 5 on the solid stop 12, the support segments 4 and consequently the charging grate are raised and thus can be removed from the heat treatment furnace. Insofar as the support block 6 in the chain is rotated in the chain sprocket 8 into the vertical position, the supports segments 4 lose their support, therefore, are lowered and deposit the charging grate on the charging carriage 15.

The entire disclosure of German priority application P.3430118.6 is hereby incorporated by reference.

What is claimed is:

1. A loading apparatus for conveying a charging grate into a heat treatment furnace comprising a furnace having an opening for receiving a charging grate, a charging grate, at least one sprocket chain strand connected to said grate, guide rail means extending through said opening in said furnace, said strand having links each having a roller engaging said guide rail means, each said roller having an axle, said charging grate having a selected length, said chain strand having at intervals corresponding approximately to said selected length a plurality of pairs of swivelable, upwardly directed rocker arms having mounted at their ends support segments, said rocker arm pairs being arranged in series from adjacent one end of said chain strand a support block mounted after the last one of said pair of rocker arms and said last support segment having a retaining cam associated therewith.

2. The invention as claimed in claim 1 wherein said sprocket chain strand comprises a plurality of links and said support segments span at least two of said lengths.

3. A loading apparatus according to claim 2 wherein the first and last support segments are provided at their outer ends with a roll.

4. A loading apparatus according to claim 1 wherein the first and last support segments are provided at their outer ends with a roll.

5. A loading apparatus as claimed in claim 4 wherein a charging carriage is provided and said chain strand is guided over said charging carriage, said charging carriage supporting at least one upsetting device, each said rocker arm having an upsetting cam extending therefrom, said upsetting device being engageable with said upsetting cams of said rocker arms, said upsetting device having clip means supported therewith which is movable upon loading of said charging grate with a load so as to move said upsetting device into an inoperative position.

6. A loading apparatus as claimed in claim 3 wherein a charging carriage is provided and said chain strand is guided over said charging carriage, said charging carriage supporting at least one upsetting device, each said rocker arm having an upsetting cam extending therefrom, said upsetting device being engageable with said upsetting cams of said rocker arms, said upsetting device having clip means supported therewith which is movable upon loading of said charging grate with a load so as to move said upsetting device into an inoperative position.

7. A loading apparatus as claimed in claim 2 wherein a charging carriage is provided and said chain strand is guided over said charging carriage, said charging carriage supporting at least one upsetting device, each said rocker arm having an upsetting cam extending therefrom, said upsetting device being engageable with said upsetting cams of said rocker arms, said upsetting device having clip means supported therewith which is movable upon loading of said charging grate with a load so as to move said upsetting device into an inoperative position.

* * * * *